United States Patent [19]

Amano et al.

[11] Patent Number: 6,004,613
[45] Date of Patent: Dec. 21, 1999

[54] PROCESS FOR PREPARING TOFU

[75] Inventors: Toshio Amano; Shigeru Murao; Miwa Nishida; Kurumi Miyamoto, all of Osaka, Japan

[73] Assignee: House Foods Corporation, Higashiosaka, Japan

[21] Appl. No.: 08/926,973

[22] Filed: Sep. 10, 1997

[30]     Foreign Application Priority Data

Sep. 10, 1996   [JP]   Japan .................................. 8-262599

[51] Int. Cl.⁶ ................................ A23L 1/20; A23L 1/00
[52] U.S. Cl. ............................................ 426/634; 426/507
[58] Field of Search ..................................... 426/634, 507

[56]                References Cited

U.S. PATENT DOCUMENTS

| | | | |
|---|---|---|---|
| 4,789,556 | 12/1988 | Okonogi et al. | 426/634 |
| 4,791,001 | 12/1988 | Matsuura et al. | 426/634 |
| 4,826,701 | 5/1989 | Joo et al. | 426/634 |
| 4,828,869 | 5/1989 | Doi et al. | 426/634 |
| 4,895,730 | 1/1990 | Chikarashi | 426/634 |
| 4,971,825 | 11/1990 | Kitazume et al. | 426/634 |
| 4,992,294 | 2/1991 | Noguchi | 426/634 |
| 5,124,165 | 6/1992 | Obata et al. | 426/634 |
| 5,183,681 | 2/1993 | Okamoto et al. | 426/634 |

FOREIGN PATENT DOCUMENTS

| | | |
|---|---|---|
| 48-34225 | 10/1973 | Japan . |
| 1-218567 | 8/1989 | Japan . |

*Primary Examiner*—Anthony J. Weier
*Attorney, Agent, or Firm*—Oblon, Spivak, McClelland, Maier & Neustadt, P.C.

[57]                 ABSTRACT

A process for preparing a tofu which comprises heat treating "go", or soy milk separated from it, wherein the heat treating is performed under the following conditions (A) and (B):

(A) raising a temperature of the "go" or the soy milk from 60° C. to 90° C. within 150 seconds or less; and then (B) heat treating the "go" or the soy milk at a temperature of 90 to 105° C.; to obtain soy milk derived from the "go", or the soy milk, having the following properties:

viscosity of the derived soy milk at 20° C. after the heat treating is within 110 cp or less; and Brix of the derived soy milk after the heat treating is 9 to 15%, and then coagulating the soy milk derived from the "go" or the soy milk separated from it, by adding a coagulant to prepare the tofu.

4 Claims, 2 Drawing Sheets

PROCESS FOR PREPARING TOFU

DISCLOSURE OF THE INVENTION

The present invention relates to a process for efficiently preparing high-quality tofu having good firmness, shape retention and texture. More particularly, the present invention relates to a method for manufacturing tofu which comprises subjecting "go" (hereinafter described as go) obtained by a conventional method, or soy milk separated from it, to a heat treatment under special conditions, which markedly lowers the viscosity of the soy milk obtained from said go or the viscosity of the soy milk after said heat treatment, and then coagulating the soy milk to yield a product. This makes possible the efficient manufacture of high-quality tofu having good firmness, shape retention and texture without causing any pronounced increase in the viscosity of the tofu. Also, the present invention provides a novel process for preparing tofu that makes it possible to manufacture high-quality tofu products using soy milk with a concentration ranging from relatively low to high.

BACKGROUND OF THE INVENTION

The manufacture of tofu generally involves steps, such as the adding and mixing a coagulant to soy milk, under gently stirring at a temperature of 70 to 75° C., charging the mixture in a molding container, removing a product from the container, cutting and immersing it in water. Soy milk, meanwhile, is usually manufactured by soaking soybeans in water for 12 to 17 hours, then grinding the soybeans along with water to obtain go, boiling this go to subject it to a heat treatment, and then separating the lees of soybean from this go by centrifugation, pressing, or another such means.

In the past, the soy milk separated from the heated go would undergo a sharp increase in viscosity during a tofu manufacturing process such as this, and this is known to make handling of the soy milk extremely difficult. In an effort to improve aptitude for the secondary processing of soy milk, attempts have been made in the past at lowering the viscosity of the soy milk obtained by separating from the go, or of this soy milk to which a coagulant has been added.

For example, Japanese Laid-Open Patent Application 1-218567 (1989) discloses a method for keeping the low level of the viscosity of the soy milk to which magnesium chloride is added at a concentration of 13% or less, wherein the soy milk is prepared by heating indirectly the go solution obtained by grinding raw soybeans up to 100° C. to 105° C. under pressure to agitate and uniformly denature it, then separating the lees of soybean, and cooling the product. Also, Japanese Patent Publication 48-34225 (1973) discloses a method for remarkably decreasing the viscosity of a protein-dispersed solution in which, in the process of treating protein obtained from soybeans, the protein-dispersed solution being adjusted to a neutral pH is treated in a high-pressure homogenizer, heated to at least 120° C. by the introduction of live steam in a pipeline, held at this temperature for no longer than 10 seconds to undergo specific sterilization and denaturation, and this product is then sprayed into a vacuum chamber and thereby concentrated and cooled to obtain the product.

With the former method, however, the go solution must be indirectly heated under pressure up to the product temperature of 100 to 105° C., and an apparatus accomplishing this indirect heating under pressure is needed. Similarly, with the latter method, the protein-dispersed solution must be treated in a high-pressure homogenizer, and then must be heated to at least 120° C. by the introduction of live steam in a pipeline, and must be held at this temperature for no longer than 10 seconds, so a high-pressure homogenizer and equipment for introducing the live steam into the pipeline are needed. Also, in the latter case, the object of the method is to enhance the sterilization and digestion of a soya protein product, denature the properties of it, and enhance the storage stability of the finished product, and the manufacture of tofu is not targeted in the case.

SUMMARY OF THE INVENTION

The present invention provides a convenient process for preparing high-quality tofu having good firmness, shape retention and texture.

The present invention relates to a process for preparing tofu which comprises heat treating go obtained by a conventional method, or soy milk separated from it, and then coagulating the soy milk thus obtained, wherein the following constitutions are adopted:

(A) raising the temperature of the raw material from 60° C. to 90° C. within 150 seconds and less, in the course of heat treating required in the following (B);

(B) heat treating the raw material at a temperature of 90 to 105° C.;

(C) maintaining the viscosity of the soy milk at 20° C. after the heat treatment within 110 cp and less; and (D) adjusting the Brix of the soy milk after the heat treatment to 9 to 15%.

With the present invention, the following merits being unattainable with a conventional method are obtained, that is, it is possible to markedly lower the viscosity of the soy milk obtained, and thereby, it becomes much easier to handle the soy milk during tofu manufacture; it becomes possible to use soy milk with a concentration ranging from low to high; it becomes possible to prepare the finished product being high in quality with good firmness, shape retention and texture; it becomes possible to prepare tofu having sufficient firmness, shape retention and a nice texture efficiently from soy milk with a relatively low concentration; and it becomes possible to prepare tofu with even firmer consistency and texture by using soy milk with a high concentration.

DETAILED DESCRIPTION OF THE INVENTION

Figure 1:
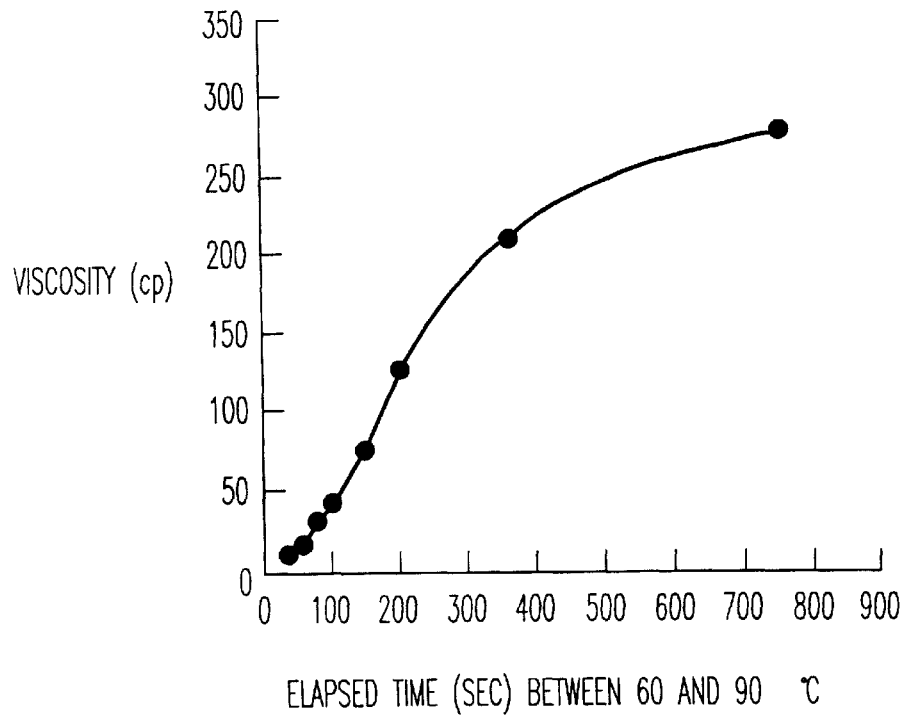
FIG. 1 illustrates the relation between the viscosity of the soy milk and the elapsed time between 60 and 90° C. during the heating of the go.

Under such circumstances, the inventors conducted painstaking research aimed at establishing a novel technique which would not require the special apparatus or equipment mentioned above, with which it would be possible to markedly lower the viscosity of soy milk obtained by separating from go, as well as the viscosity of soy milk obtained by separating from go after heating, and with which it would be possible to manufacture with ease a high-quality tofu product having good firmness, shape retention and texture. As a result, they arrived at the present invention upon discovering that if the go, or the soy milk separated from it, is heat treated under special conditions, the viscosity of the soy milk obtained by separating from said go, or the viscosity of the soy milk after the heat treatment, can be markedly lowered, and said high-quality tofu can be manufactured using said soy milk.

Specifically, an object of the present invention is to provide a process for preparing high-quality tofu, which does not require the special apparatus or equipment needed in the past, by using soy milk obtained by markedly lowering the viscosity of the soy milk obtained by separating from the go after the heat treatment, or the viscosity of the soy milk after said heat treatment, merely by treating go, or soy milk separated from it, under special heating conditions.

The method of the present invention intended to achieve the stated object is a process for preparing tofu which comprises heat treating go obtained by a conventional method, or soy milk separated from it, and then coagulating the soy milk thus obtained, wherein the following constitutions are adopted:

(A) raising the temperature of the raw material from 60° C. to 90° C. within 150 seconds and less, in the course of heat treating required in the following (B);

(B) heat treating the raw material at a temperature of 90 to 105° C.;

(C) maintaining the viscosity of the soy milk at 20° C. after the heat treatment within 110 cp and less; and (D) adjusting the Brix of the soy milk after the heat treatment to 9 to 15%.

As preferred embodiments of the present invention, said tofu preparing method, wherein the heat treatment is carried out for 1 to 20 minutes, said tofu preparing method, wherein the tofu obtained by coagulation is heat treated in order to separately sterilize it at 80 to 100° C. for 50 to 100 minutes, and said tofu manufacturing method, wherein the fracture strength of the tofu thus obtained is 250 to 350 gf are included.

As long as the above-mentioned heating conditions of the go or the soy milk separated from it are satisfied, there are no particular restrictions on the other conditions in the present invention. For instance, there are no particular restrictions on the heat treatment conditions for raising the temperature of the go to 60° C., nor on the heat treatment conditions for raising the temperature to 90° C.

The present invention will now be described in detail.

In the present invention, soybeans are first washed, after which they are soaked in water long enough for the water to be thoroughly absorbed into the soybeans. These soybeans are then ground along with water to manufacture go (to form a slurry cold go). A favorable example of the proportion of soybeans and water here is 1:2 to 1:3. In said grinding of the soybeans, a grinder such as a mortar type or a high-speed pulverizer may be used, and when the go is being mass-produced with an in-line system, a colloidal mill or other such apparatus may be used, for example.

The lees of soybean (cold okara) are separated from the go thus obtained to yield soy milk, wherein the go is heat treated prior to this step. The purpose of the heat treatment of the go is to heat and denature the soya protein, and a characteristic of the present invention is that this heat treatment is carried out under special conditions. Specifically, the present invention is characterized in that the heat treatment of the go is such that the time required for the temperature of the go to be raised from 60° C. to 90° C. is within 150 seconds and less, and preferably within 100 seconds. In this case, it is also possible to heat treat the soy milk separated from the go if so desired.

This will allow a marked decrease in the viscosity of the soy milk obtained from the go, or in the viscosity of the soy milk after said heat treatment. As a result, when tofu is manufactured using soy milk whose viscosity has thus been lowered, it is possible to obtain so-called "firm" high-quality tofu having better firmness than tofu obtained using soy milk obtained from go heat treated under heating conditions that do not satisfy the above requirements.

As long as the above conditions are satisfied, the go can be heat treated under any conditions. For example, the heating time for bringing the temperature of the go from room temperature to 60° C. may be lengthened or shortened. Also, after the temperature of the go has been raised to 90° C., the heating time for further raising the temperature may be lengthened or shortened. In short, the important point in achieving the object of the present invention is that the heating time for the raw material in the course of raising the temperature of the go, or of the soy milk separated from it, from 60 to 90° C. be no longer than 150 seconds, and preferably no longer than 100 seconds.

Favorable examples of the heating method in said heating include direct heating methods (such as the use of a steamer) and indirect heating methods (such as a steam jacket type of heater). The go that has been heat treated under the above conditions is separated from the lees of soybean by a conventional method to obtain soy milk. There are no particular restrictions on the separation method, but an example is to obtain soy milk by using a centrifuge, a filtration apparatus, or the like to separate the lees of soybean from the go.

The soy milk separated from the go can also be heat treated under the above conditions to obtain a soy milk raw material (constitution (A)).

Next, the soy milk raw material that has been heated under the above conditions is heat treated to a product temperature of 90 to 105° C., and preferably 98 to 102° C. This heat treatment is carried out for the purpose of suitably denaturing the protein in the soy milk raw material, and thereby being able to manufacture tofu with favorable consistency, strength and texture in the subsequent coagulation step. If the product temperature is lower than 90° C. during this heating, the protein in the soy milk raw material will not be sufficiently denatured, whereas if 105° C. is exceeded, the protein in the soy milk raw material will be denatured too much, so in either case the tofu will not coagulate in a favorable state. Thus, it is important that the soy milk raw material be heat treated within the above range of conditions, which yields a high-quality tofu. For the same reason, it is preferable for the heat treatment to be carried out at the above product temperature for 2 to 10 minutes, for example. The heating method is the same as above (constitution (B)).

The heat treatment is performed such that the viscosity at 20° C. of the soy milk after the heat treatment (measured by the same method as in the following examples and test examples) is no more than 110 cp, and preferably no more than 95 cp, and more preferably no more than 75 cp. As mentioned above, when the temperature of the go, or of the soy milk separated from it, is raised, and the soy milk raw material is coagulated under conditions such that the viscosity will be within this range, tofu with the desired consistency, strength and texture can be manufactured. If the viscosity of the soy milk exceeds 110 cp, the tofu will not coagulate, or the strength will tend to be inadequate (constitution (C)).

Also, the Brix of the soy milk after the heat treatment should be 9 to 15%, and preferably 10 to 13%. Tofu can be manufactured well from soy milk raw materials with a wide range of protein concentrations with the present invention, but if said soy milk has a concentration within the above range, the various structures of the manufacturing steps and the action thereof will be organically combined, allowing for the manufacture of a high-quality tofu having the desired consistency, strength and texture (constitution (D)).

In the manufacture of tofu from soy milk obtained as above, said soy milk is heat treated by a conventional method, after which a coagulant is added and mixed. Examples of coagulants that can be used include calcium sulfate, magnesium chloride, and other such divalent metal salts, and delta-gluconic lactone and other such lactones. These can be used singly or in combinations of two or more types. A favorable example of the amount added thereof is 0.1 to 1.0 wt % with respect to the soy milk. with the present invention, by using go that has been heat treated under the above special conditions, or soy milk separated from this go, the following merits being unattainable with a conventional method are obtained, that is, it is possible to markedly lower the viscosity of the soy milk obtained, and thereby, it becomes much easier to handle the soy milk during tofu manufacture; it becomes possible to use soy milk with a concentration ranging from low to high; it becomes possible to prepare the finished product being high in quality with good firmness, shape retention and texture; it becomes possible to prepare tofu having sufficient firmness, shape retention and a nice texture efficiently from soy milk with a relatively low concentration; and it becomes possible to prepare tofu with even firmer consistency and texture by using soy milk with a high concentration.

EXAMPLES

The present invention will now be illustrated more concretely by referring to the following examples and test examples, but the present invention is in no way limited by these examples.

Examples 1–5 and Comparative Examples 1–3
Manufacture of soy milk and tofu

After being washed, raw soybeans were soaked for 15 hours in water at 20° C., and then ground along with addition of water to it to yield go. The thus obtained go was heated and agitated in a steamer, subjected to a screw-type separator to separate the lees of soybean and yield a soy milk, and the soy milk thus obtained was cooled to 70° C., and then to 100 parts of the soy milk thus obtained were added 0.4 part calcium sulfate and 0.2 part delta-gluconic lactone under stirring to coagulate the soy milk and to manufacture tofu.

The above-mentioned heat treatment was carried out according to the heating conditions given in Table 1, wherein the time taken for the temperature to be raised from 60 to 90° C. in the course of heat treating was termed A (seconds), and the heat treatment conditions were termed B (° C., minutes).

Test for quality of finished product

The quality of the finished product was tested, wherein the viscosity of the soy milk after the heat treatment was termed C (cp), the Brix was termed D (%), and the fracture strength of the tofu obtained by coagulation of the soy milk was termed E (gf).

The viscosity of the soy milk was measured using a B-type viscometer for the maximum viscosity at 20° C., with a No. 2 rotor used at 60 rpm. The fracture strength of the tofu was measured by using a creep meter (made by Kabushiki Kaisha Yamaden), cutting the tofu into a cylinder measuring 20 mm in diameter and 20 mm in height, and pressing a plunger 40 mm in diameter against this cylinder from above in the axial direction.

Figure 2:
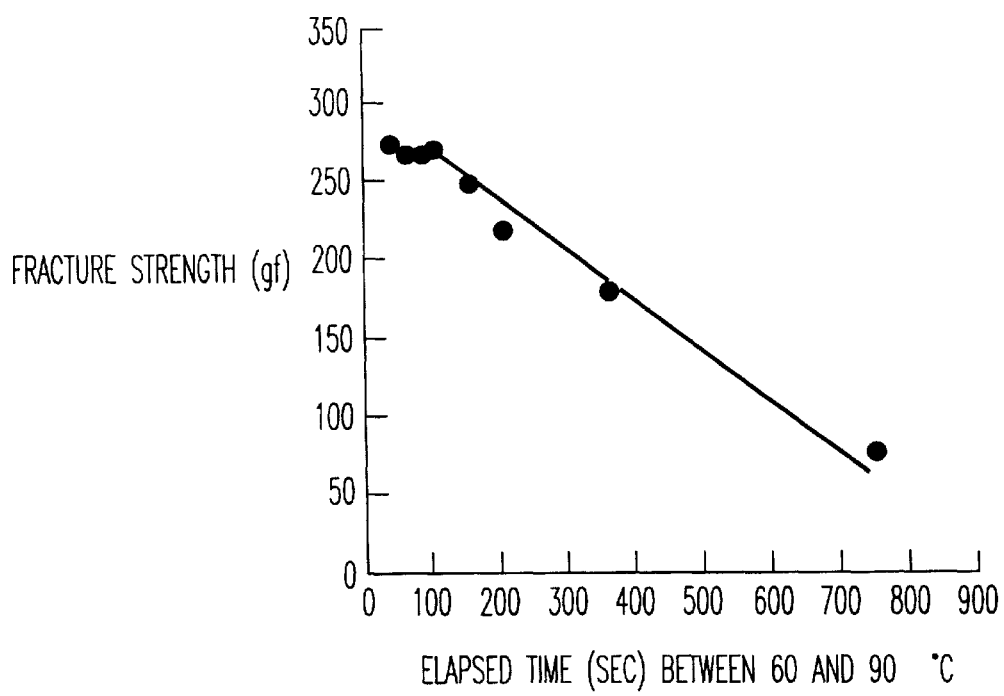
FIG. 2 illustrates the relation between the fracture strength of the tofu and the elapsed time between 60 and 90° C. during the heating of the go.
Figure 3:
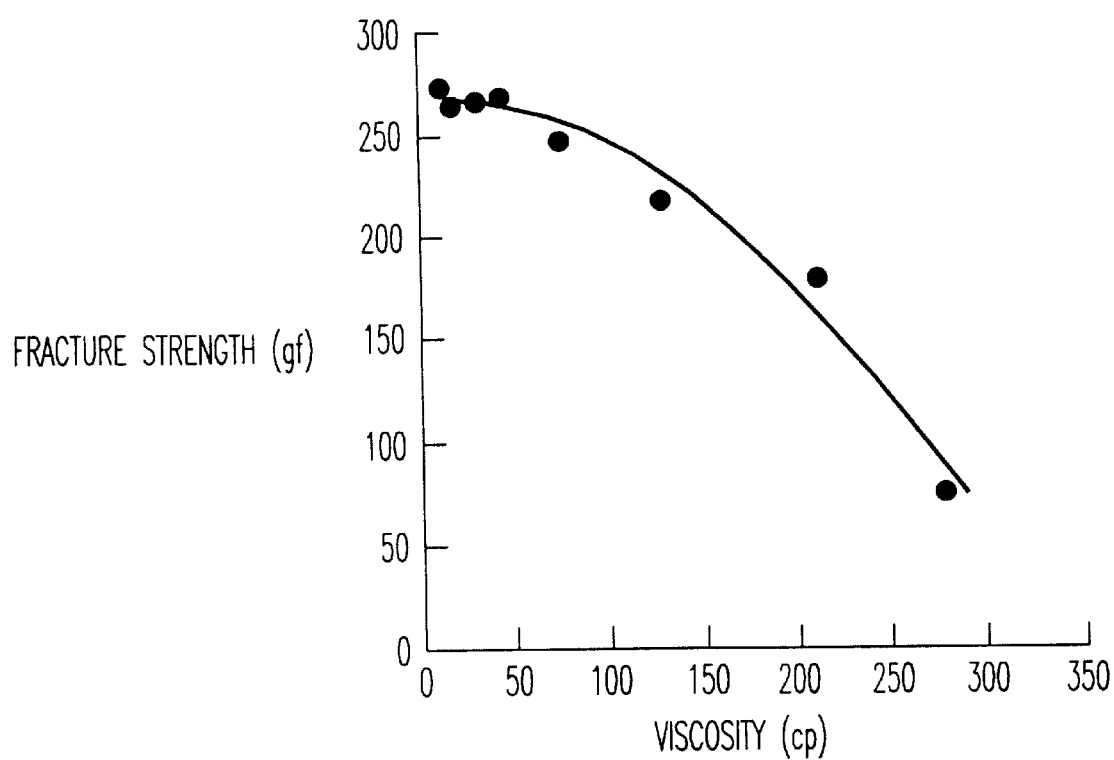
FIG. 3 is a diagram illustrating the relation between the fracture strength of the tofu and the viscosity of the soy milk.

These results are given in Table 1. FIG. 1 shows the relation between heating conditions and the viscosity of the soy milk, FIG. 2 shows the relation between heating conditions and the breaking strength of the tofu, and FIG. 3 shows the relation between the viscosity of the soy milk and the fracture strength of the tofu.

TABLE 1

|       | A (sec) | B             | C (cp) | D (%) | E (gf) | Quality |
|-------|---------|---------------|--------|-------|--------|---------|
| E.1   | 40      | 100° C., 5 min | 12.5   | 13.1  | 272    | good firmness, shape retention, texture |
| E.2   | 60      | 100° C., 5 min | 17.5   | 12.9  | 267    | good firmness, shape retention, texture |
| E.3   | 80      | 100° C., 5 min | 31.5   | 13.1  | 267    | good firmness, shape retention, texture |
| E.4   | 100     | 100° C., 5 min | 43.0   | 13.0  | 269    | good firmness, shape retention, texture |
| E.5   | 150     | 100° C., 5 min | 75.0   | 12.8  | 247    | good firmness, shape retention, texture |
| C.E.1 | 200     | 100° C., 5 min | 126.0  | 12.9  | 218    | somewhat soft, poor shape retention, crumbled |
| C.E.2 | 360     | 100° C., 5 min | 210.0  | 13.1  | 179    | soft, no shape retention, crumbled easily |
| C.E.3 | 750     | 100° C., 5 min | 278.0  | 13.0  | 76     | soft, no shape retention, crumbled easily |

E.:Example;
C.E.:Comparative Example

As is clear from Table 1, in Examples 1 through 5, high-quality finished products having good firmness, shape retention and texture were obtained when the soy milk concentration was within the most favorable range for a finished product. It can also be seen from these examples that strong tofu can be obtained both from soy milk with a relatively low concentration and from soy milk with a high concentration (with a convenient method than in the past).

It can be seen that in Comparative Examples 1 through 3, the viscosity of the soy milk rose and the strength of the tofu was insufficient when the temperature elevation was delayed.

It can be seen from these test results that when the time taken for the temperature to be raised from 60 to 90° C. is set to 150 seconds or less, the viscosity of the soy milk can be lowered, and tofu with good firmness can be obtained (see FIGS. 1 through 3).

The present invention is characterized in that the heat treatment is conducted under special conditions in the course of manufacturing tofu which comprises heat treating go obtained by a conventional method, or soy milk separated from it, and then coagulating the soy milk obtained from it. With the present invention, the following merits being unattainable with a conventional method are obtained, that is, it is possible to markedly lower the viscosity of the soy milk obtained, and thereby, it becomes much easier to handle the soy milk during tofu manufacture; it becomes possible to use soy milk with a concentration ranging from low to high; it becomes possible to prepare the finished product being high in quality with good firmness, shape retention and texture; it becomes possible to prepare tofu having sufficient firmness, shape retention and a nice texture efficiently from soy milk with a relatively low concentration; and it becomes possible to prepare tofu with even firmer consistency and texture by using soy milk with a high concentration.

What is claimed is:

1. A process for preparing a tofu which comprises heat treating "go", or soy milk separated from it, wherein the heat treating is performed under the following conditions (A) and (B):

(A) raising a temperature of the "go" or the soy milk from 60° C. to 90° C. within 150 seconds or less; and then (B) heat treating the "go" or the soy milk at a temperature of 90 to 105° C.; to obtain soy milk derived from the "go", or the soy milk, having the following properties:

viscosity of the derived soy milk at 20° C. after the heat treating is within 110 cp or less; and Brix of the derived soy milk after the heat treating is 9 to 15% and then coagulating the soy milk derived from the "go" or the soy milk separated from it, by adding a coagulant to prepare the tofu.

2. The process for preparing the tofu as defined in claim 1, wherein the heat treating is performed for 1 to 20 minutes.

3. The process for preparing the tofu as defined in claim 1, wherein the tofu obtained by the coagulating is further heat treated in order to sterilize it at 80 to 100° C. for 50 to 100 minutes.

4. The process for preparing the tofu as defined in claim 1, wherein fracture strength of the tofu obtained is 250 to 350 gf.

* * * * *